No. 12,237. REISSUED JUNE 28, 1904.

M. COFFEY.

GARMENT CLASP.

APPLICATION FILED APR. 26, 1904.

Witnesses:

H. S. Gaither

C. C. Cunningham

Inventor:

Michael Coffey by Chamberlin & Wilkinson

Attorneys

No. 12,237. Reissued June 28, 1904.

UNITED STATES PATENT OFFICE.

MICHAEL COFFEY, OF CHICAGO, ILLINOIS.

GARMENT-CLASP.

SPECIFICATION forming part of Reissued Letters Patent No. 12,237, dated June 28, 1904.

Original No. 721,782, dated March 3, 1903. Application for reissue filed April 26, 1904. Serial No. 205,053.

*To all whom it may concern:*

Be it known that I, MICHAEL COFFEY, a citizen of the United States, residing at Chicago, in the county of Cook and State of Illinois, have invented certain new and useful Improvements in Garment-Clasps; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to garment-clasps, and comprises in its construction a suitable loop having a contracted neck, together with a toggle, the lower member of which is made of or covered with rubber or other elastic material and has a head wider than the neck, so that when the edge of the garment is inserted through the loop and over the head it is prevented from withdrawal through the neck.

The object of the invention is to form an improved clasp of this class which will more effectually prevent the toggle from buckling and the garment from slipping out and also avoid wearing or tearing the garment.

Figure 1:
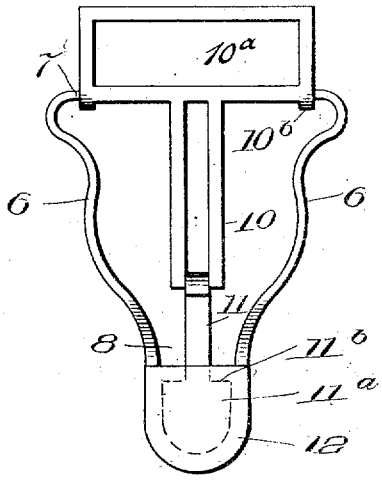
Figure 2:
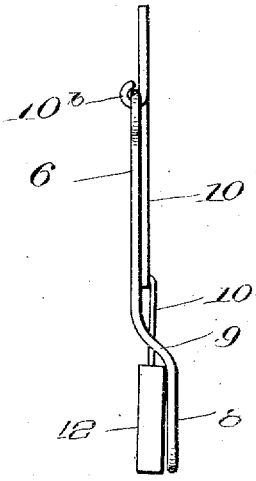
Figure 4:
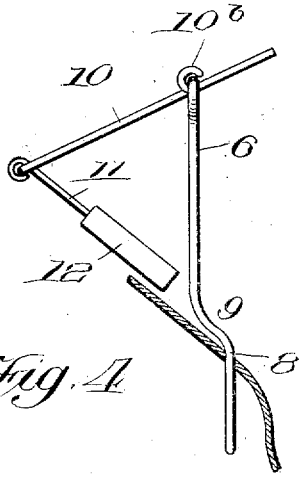
Figure 3:
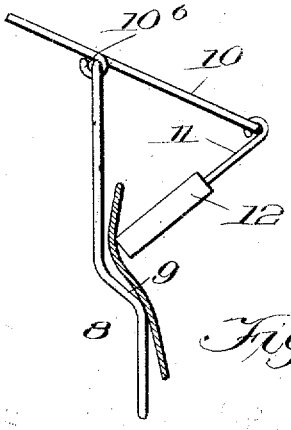

In the accompanying drawings, Figure 1 is a front plan view of the clasp. Fig. 2 is an edge view. Fig. 3 is an edge view showing the operation when the garment is clasped. Fig. 4 is an edge view showing the operation when the garment is released.

Referring specifically to the drawings, a loop is formed of wire or other suitable material and comprises separated side portions 6, which are connected at the top by a cross-bar 7. The lower ends of the side portions converge to form a narrow engaging neck 8, which is offset backwardly to form shoulders 9, as best shown in the edge views. The toggle consists of upper and lower members 10 and 11, hinged together, and the upper member is hinged to the cross-bar 7, as at $10^b$, and has a slot $10^a$ at the upper end to attach a suspending-strap. The lower toggle member or tongue extends between the shoulders of the loop and is widened at its lower end to form a head $11^a$ and projecting shoulders $11^b$, which latter engage or abut against the shoulders of the loop. The head with its covering is wider than the neck of the loop, but is not so wide as the space between the body portions 6 thereof. The toggle may therefore be flexed and swung through between said portions in either direction. The head is preferably formed of or covered with rubber, as indicated at 12.

To clasp the garment, the toggle is flexed backward, as shown in Fig. 3, and the edge of the garment brought up between the loop of the toggle. The head of the tongue is then pushed through between the portions 6, carrying with it the fabric, and the toggle straightened to bring the head down upon the neck of the loop. The garment is thus clasped, and the strain thereon will not buckle the toggle, because the shoulders on the tongue back against the shoulders of the loop.

To detach the clasp, the toggle is flexed in the other direction, as shown in Fig. 4, and the garment may be readily slipped out.

What I claim is—

1. The combination with a loop having a contracted neck at its lower end, of a toggle operatively connected thereto, both members of said toggle adapted to swing in both directions through the enlarged portion of the loop.

2. The combination with a loop having a contracted neck at its lower end, of a toggle the upper member of which is hinged to the loop, both members of said toggle adapted to swing through the loop.

3. The combination with a loop having a contracted neck at its lower end, of a toggle the upper member of which is hinged to the loop, both members adapted to swing through the loop, and the toggle adapted to break in both directions.

4. The combination with a loop having a contracted neck at its lower end, offset to form shoulders, of a toggle the upper member of which is hinged to the loop and adapted to swing through the same and the lower member of which has a head which is adapted to abut against the shoulders.

5. The combination with the loop having the neck 8 and shoulders 9, of the toggle hinged thereto and adapted to swing therethrough, the lower member of which has the shoulders $11^b$.

6. The combination with a loop having a contracted neck at its lower end, of a toggle operatively connected with the loop, both members of said toggle adapted to swing through the loop and the lower member of which has a head formed of elastic material.

7. The combination with a loop having a contracted neck at its lower end, offset to form shoulders, of a toggle the upper member of which is hinged to the loop and the lower member of which has a head formed of elastic material which is adapted to abut against the shoulders.

In testimony whereof I affix my signature in presence of two witnesses.

MICHAEL COFFEY.

Witnesses:
GEO. L. WILKINSON,
CLARA C. CUNNINGHAM.